(12) United States Patent
Shalit

(10) Patent No.: US 7,024,625 B2
(45) Date of Patent: Apr. 4, 2006

(54) MOUSE DEVICE WITH TACTILE FEEDBACK APPLIED TO HOUSING

(75) Inventor: Thomer Shalit, Umea (SE)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 09/125,711

(22) PCT Filed: Feb. 21, 1997

(86) PCT No.: PCT/SE97/00293

§ 371 (c)(1),
(2), (4) Date: Mar. 4, 1999

(87) PCT Pub. No.: WO97/31333

PCT Pub. Date: Aug. 28, 1997

(65) Prior Publication Data

US 2002/0024501 A1 Feb. 28, 2002

(30) Foreign Application Priority Data

Feb. 23, 1996 (SE) ............................................. 9600686

(51) Int. Cl.
*G06F 9/00* (2006.01)
*G09G 5/00* (2006.01)

(52) U.S. Cl. ....................... 715/702; 715/700; 715/701; 345/156; 345/163

(58) Field of Classification Search ......... 345/156–167, 345/145, 146; 715/700–702
See application file for complete search history.

(56) References Cited

U.S. PATENT DOCUMENTS

| 2,972,140 A | 2/1961 | Hirsch |
| 3,157,853 A | 11/1964 | Hirsch |
| 3,220,121 A | 11/1965 | Cutler |
| 3,497,668 A | 2/1970 | Hirsch |

(Continued)

FOREIGN PATENT DOCUMENTS

| DE | 4400790 A1 | 5/1995 |
| EP | 0265011 | 10/1987 |

(Continued)

OTHER PUBLICATIONS

Patrick, "Design, Construction, and Testing of a Fingertip Tactile Display for Interaction with Virtual and Remote Environments," *Master of Science Thesis*, MIT, Aug. 1990, archived Nov. 8, 1990.

Calder, "Design of a Force–Feedback Touch–Introducing Actuator For Teleoperator Robot Control," *Bachelor of Science Thesis*, MIT, May 1983, archived Jun. 23, 1983.

(Continued)

*Primary Examiner*—Xiao Wu
*Assistant Examiner*—Duc Q Dinh
(74) *Attorney, Agent, or Firm*—Thelen Reid & Priest LLP; David B. Ritchie

(57) ABSTRACT

A computer mouse device for tracking user input and providing tactile feedback. A housing includes a lower portion designed to move over a flat surface, and a casing portion engaged by a palm of a user's hand. A sensor is provided within the housing for tracking the motion of the housing with repect to the flat surface, where motion data from the sensor is transmitted to a host computer for updating the status of a cursor on a graphical display displaying one or more graphical details. The mouse device receives over signal lines a sensory feedback signal from the host computer when the displayed cursor interacts with a graphical detail in response to the motion data. An actuator is included within and coupled to the housing and generates motion of the casing in a direction substantially orthogonal to the flat surface, delivering a tactile sensation to the user's palm in response to the sensory feedback signal received over the signal lines.

34 Claims, 4 Drawing Sheets

U.S. PATENT DOCUMENTS

| | | |
|---|---|---|
| 3,517,446 A | 6/1970 | Corlyon et al. |
| 3,623,064 A | 11/1971 | Kagan |
| 3,902,687 A | 9/1975 | Hightower |
| 3,903,614 A | 9/1975 | Diamond et al. |
| 3,911,416 A | 10/1975 | Feder |
| 3,919,691 A | 11/1975 | Noll .................... 340/172.5 |
| 4,127,752 A | 11/1978 | Lowthorp |
| 4,160,508 A | 7/1979 | Salsbury et al. |
| 4,236,325 A | 12/1980 | Hall et al. |
| 4,262,549 A | 4/1981 | Schwellenbach |
| 4,333,070 A | 6/1982 | Barnes |
| 4,414,984 A | 11/1983 | Zarudiansky |
| 4,464,117 A | 8/1984 | Foerst |
| 4,484,191 A | 11/1984 | Vavra |
| 4,513,235 A | 4/1985 | Acklam et al. |
| 4,560,983 A | 12/1985 | Williams .................. 340/825 |
| 4,581,491 A | 4/1986 | Boothroyd |
| 4,599,070 A | 7/1986 | Hladky et al. |
| 4,706,294 A | 11/1987 | Ouchida .................... 381/109 |
| 4,708,656 A | 11/1987 | De Vries et al. |
| 4,713,007 A | 12/1987 | Alban |
| 4,731,603 A | 3/1988 | McRae et al. |
| 4,794,392 A | 12/1988 | Selinko |
| 4,795,296 A | 1/1989 | Jau ............................. 414/5 |
| 4,800,721 A | 1/1989 | Cemenska et al. ........... 60/393 |
| 4,823,634 A | 4/1989 | Culver .................. 74/471 XY |
| 4,868,549 A * | 9/1989 | Affinito et al. ............. 345/164 |
| 4,871,992 A | 10/1989 | Petersen |
| 4,885,565 A | 12/1989 | Embach |
| 4,891,764 A | 1/1990 | McIntosh |
| 4,930,770 A | 6/1990 | Baker |
| 4,934,694 A | 6/1990 | McIntosh |
| 4,983,901 A | 1/1991 | Lehmer ..................... 318/685 |
| 5,019,761 A | 5/1991 | Kraft |
| 5,022,384 A | 6/1991 | Freels et al. |
| 5,022,407 A | 6/1991 | Horch et al. |
| 5,035,242 A | 7/1991 | Franklin |
| 5,038,089 A | 8/1991 | Szakaly |
| 5,044,956 A | 9/1991 | Behensky et al. ............. 434/45 |
| 5,078,152 A | 1/1992 | Bond |
| 5,107,262 A | 4/1992 | Cadoz et al. .................. 341/22 |
| 5,146,566 A | 9/1992 | Hollis, Jr. et al. .......... 395/275 |
| 5,165,897 A | 11/1992 | Johnson |
| 5,175,459 A | 12/1992 | Danial et al. |
| 5,184,319 A | 2/1993 | Kramer ..................... 364/806 |
| 5,185,561 A | 2/1993 | Good et al. ................. 318/432 |
| 5,186,629 A * | 2/1993 | Rohen ........................ 434/114 |
| 5,186,695 A | 2/1993 | Mangseth et al. |
| 5,203,563 A | 4/1993 | Loper, III ................. 273/148 B |
| 5,212,473 A | 5/1993 | Louis |
| 5,220,260 A | 6/1993 | Schuler ..................... 318/561 |
| 5,223,776 A | 6/1993 | Radke et al. ............. 318/568.1 |
| 5,235,868 A | 8/1993 | Culver .................. 74/471 XY |
| 5,240,417 A | 8/1993 | Smithson et al. |
| 5,264,836 A | 11/1993 | Rubin ........................ 345/157 |
| 5,271,290 A | 12/1993 | Fischer |
| 5,275,174 A | 1/1994 | Cook |
| 5,283,970 A | 2/1994 | Aigner |
| 5,296,871 A | 3/1994 | Paley ........................ 345/163 |
| 5,299,810 A | 4/1994 | Pierce |
| 5,309,140 A | 5/1994 | Everett |
| 5,334,027 A | 8/1994 | Wherlock |
| 5,354,162 A | 10/1994 | Burdea et al. ................. 414/5 |
| 5,355,148 A | 10/1994 | Anderson ................... 345/166 |
| 5,388,992 A | 2/1995 | Franklin et al. |
| 5,396,266 A | 3/1995 | Brimhall .................... 345/161 |
| 5,399,091 A | 3/1995 | Mitsumoto .................. 434/61 |
| 5,405,152 A | 4/1995 | Katanics et al. ............. 273/438 |
| 5,414,337 A | 5/1995 | Schuler ..................... 318/561 |
| 5,436,622 A | 7/1995 | Gutman et al. |
| 5,437,607 A | 8/1995 | Taylor |
| 5,466,213 A | 11/1995 | Hogan |
| 5,489,812 A | 2/1996 | Furuhata et al. |
| 5,506,605 A | 4/1996 | Paley ........................ 345/163 |
| 5,512,919 A | 4/1996 | Araki ........................ 345/156 |
| 5,513,100 A | 4/1996 | Parker et al. ........... 364/167.01 |
| 5,547,382 A | 8/1996 | Yamasaki |
| 5,565,840 A | 10/1996 | Thorner et al. |
| 5,575,761 A | 11/1996 | Hajianpour |
| 5,576,727 A | 11/1996 | Rosenberg et al. .......... 345/179 |
| 5,583,478 A | 12/1996 | Renzi ....................... 340/407.1 |
| 5,587,937 A | 12/1996 | Massie et al. ............... 364/578 |
| 5,589,828 A | 12/1996 | Armstrong .................. 341/20 |
| 5,589,854 A | 12/1996 | Tsai .......................... 345/161 |
| 5,629,594 A | 5/1997 | Jacobus et al. ......... 318/568.11 |
| 5,642,469 A | 6/1997 | Hannaford et al. ............ 395/99 |
| 5,643,087 A | 7/1997 | Marcus et al. ................ 463/38 |
| 5,666,138 A | 9/1997 | Culver ...................... 345/161 |
| 5,666,473 A | 9/1997 | Wallace ..................... 345/420 |
| 5,669,818 A | 9/1997 | Thorner et al. |
| 5,684,722 A * | 11/1997 | Thorner et al. .............. 364/578 |
| 5,690,582 A | 11/1997 | Ulrich et al. |
| 5,691,898 A | 11/1997 | Rosenberg et al. .......... 364/190 |
| 5,696,537 A | 12/1997 | Solhjell |
| 5,709,219 A | 1/1998 | Chen et al. .................. 128/782 |
| 5,714,978 A | 2/1998 | Yamanaka et al. ........... 345/157 |
| 5,721,566 A | 2/1998 | Rosenberg et al. .......... 345/161 |
| 5,734,373 A | 3/1998 | Rosenberg et al. .......... 345/161 |
| 5,736,978 A | 4/1998 | Hasser et al. ............... 345/173 |
| 5,742,278 A | 4/1998 | Chen et al. .................. 345/156 |
| 5,754,023 A | 5/1998 | Roston et al. ............... 318/561 |
| 5,755,577 A | 5/1998 | Gillio ......................... 434/262 |
| 5,766,016 A | 6/1998 | Sinclair |
| 5,767,839 A | 6/1998 | Rosenberg ................. 345/161 |
| 5,781,172 A | 7/1998 | Engel et al. ................. 345/164 |
| 5,784,052 A | 7/1998 | Keyson ..................... 345/167 |
| 5,785,630 A | 7/1998 | Bobick et al. |
| 5,790,108 A * | 8/1998 | Salcudean et al. .......... 345/184 |
| 5,802,353 A | 9/1998 | Avila et al. .................. 395/500 |
| 5,825,308 A | 10/1998 | Rosenberg ................. 341/20 |
| 5,844,392 A | 12/1998 | Peurach et al. ......... 318/568.17 |
| 5,889,670 A | 3/1999 | Schuler et al. ............... 364/186 |
| 5,897,437 A | 4/1999 | Nishiumi et al. .............. 463/47 |
| 5,914,705 A | 6/1999 | Johnson et al. .............. 345/156 |
| 5,944,151 A | 8/1999 | Jakobs et al. ............. 188/267.1 |
| 5,956,016 A | 9/1999 | Kuenzner et al. |
| 5,956,484 A | 9/1999 | Rosenberg et al. ...... 395/200.33 |
| 5,959,613 A | 9/1999 | Rosenberg et al. .......... 345/161 |
| 5,973,689 A | 10/1999 | Gallery |
| 5,986,643 A * | 11/1999 | Harvill et al. ............... 345/163 |
| 5,990,869 A | 11/1999 | Kubica et al. ............... 345/163 |
| 6,001,014 A | 12/1999 | Ogata et al. .................. 463/37 |
| 6,004,134 A | 12/1999 | Marcus et al. |
| 6,044,646 A | 4/2000 | Silverbrook |
| 6,078,308 A | 6/2000 | Rosenberg et al. |
| 6,088,017 A | 7/2000 | Tremblay et al. |
| 6,088,019 A | 7/2000 | Rosenberg |
| 6,100,874 A | 8/2000 | Schena et al. |
| 6,111,577 A | 8/2000 | Zilles et al. |
| 6,125,337 A | 9/2000 | Rosenberg et al. |
| 6,160,489 A | 12/2000 | Perry et al. |
| 6,184,868 B1 | 2/2001 | Shahoian et al. |
| 6,211,861 B1 | 4/2001 | Rosenberg et al. |
| 6,219,032 B1 | 4/2001 | Rosenberg et al. |
| 6,243,078 B1 | 6/2001 | Rosenberg |
| 6,256,011 B1 | 7/2001 | Culver |
| 6,422,941 B1 | 7/2002 | Thorner et al. |

FOREIGN PATENT DOCUMENTS

| | | |
|---|---|---|
| EP | 0349086 | 1/1990 |
| EP | 0489469 | 11/1991 |

| | | |
|---|---|---|
| EP | 0 489 469 A1 | 6/1992 |
| EP | 0607580 | 12/1993 |
| EP | 0626634 | 5/1994 |
| GB | 2238215 | 5/1991 |
| JP | S62-194389 | 12/1987 |
| JP | H2-185278 | 7/1990 |
| JP | H4-8381 | 1/1992 |
| JP | 4008381 | 1/1992 |
| JP | H5-192449 | 8/1993 |
| JP | H7-24147 | 1/1995 |
| JP | 7024147 | 1/1995 |
| JP | 07096016 | 11/1995 |
| WO | WO9200559 | 1/1992 |
| WO | WO 95/32459 | 11/1995 |
| WO | WO 97/20305 | 6/1997 |

OTHER PUBLICATIONS

Wiker, "Teletouch Display Development: Phase 1 Report," *Technical Report 1230*, Naval Ocean Systems Center, San Diego, Jul. 1988.

Bliss, "Optical–to–Tactile Image Conversion for the Blind," *IEEE Transactions on Man–Machine Systems*, vol. MMS–11, No. 1, Mar. 1970.

Johnson, "Shape–Memory Alloy Tactile Feedback Actuator," *Armstrong Aerospace Medical Research Laboratory*, AAMRL–TR–90–039, Aug., 1990.

Kontarinis et al., "Tactile Display of Vibratory Information in Teleoperation and Virtual Environments," PRESENCE, 4(4):387–402, Harvard Univ., 1995.

Lake, "Cyberman from Logitech," at http://www.ibiblio.org/GameBytes/issue21/greviews/cyberman.html, 1994.

"Component Maintenance Manual With Illustrated Parts List, Coaxial Control Shaker Part No. C–25502," Safe Flight Instrument Corporation, Revised Jan. 28, 2002 (3 pages).

"Technical Manual Overhaul Instructions With Parts Breakdown, Coaxial Control Shaker Part No. C–25502," Safe Flight Instrument Corporation, Revised Jul. 15, 1980 (23 pages).

Scannel, "Taking a Joystick Ride," *Computer Currents*, Boston Edition, vol. 9, No. 11, Nov. 1994.

Yamakita et al., "Tele–Virtual Reality of Dynamic Mechanical Model," *Proceedings of the 1992 IEEE/RSJ International Conference on Intelligent Robots and Systems*, Raleigh, NC, Jul. 7–10, 1992.

Noll, "Man–Machine Tactile," *SID Journal*, Jul./Aug. 1972 Issue.

Rosenberg, "Virtual Fixtures: Perceptual Overlays Enhance Operator Performance In Telepresence Tasks," *Ph.D. Dissertation*, Stanford University, Jun. 1994.

Baigrie, "Electric Control Loading—A Low Cost, High Performance Alternative," Proceedings, pp. 247–254, Nov. 6–8, 1990.

Iwata, "Pen–based Haptic Virtual Environment," 0–7803–1363–1/93 IEEE, pp 287–292, 1993.

Russo, "The Design and Implementation of a Three Degree of Freedom Force Output Joystick," MIT Libraries Archives Aug. 14, 1990, pp. 1–131, May 1990.

Brooks et al., "Hand Controllers for Teleoperation—A State–of–the–Art Technology Survey and Evaluation," JPL Publication 85–11; NASA–CR–175890; N85–28559, pp. 1–84, Mar. 1, 1985.

Jones et al., "A perceptual analysis of stiffness," ISSN 0014–4819 Springer International (Springer–Verlag): Experimental Brain Research, vol. 79, No. 1, pp. 150–156, 1990.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25–44, May 2, 1993.

Snow et al., " Model–X Force–Reflecting–Hand–Controller," NT Control No. MPO–17851; JPL Case No. 5348, pp. 1–4, Jun. 15, 1989.

Ouh–Young, " Force Display in Molecular Docking," Order No. 9034744, p. 1–369, 1990.

Tadros, Control System Design for a Three Degree of Freedom Virtual Environment Simulator Using Motor/Brake Pair Actuators, MIT Archive © Massachusetts Institute of Technology, pp. 1–88, Feb. 1990.

Caldwell et al., " Enhanced Tactile Feedback (Tele–Taction) Using a Multi–Functional Sensory System," 1050–4729/93, pp. 955–960, 1993.

Adelstein, " Design and Implementation of a Force Reflecting Manipulandum for Manual Control research," DSC–vol. 42, Advances in Robotics, Edited by H. Kazerooni, pp. 1–12, 1992.

Gotow et al., " Controlled Impedance Test Apparatus for Studying Human Interpretation of Kinesthetic Feedback," WA11–11:00, pp. 332–337.

Stanley et al., " Computer Simulation of Interacting Dynamic Mechanical Systems Using Distributed Memory Parallel Processors," DSC–vol. 42, Advances in Robotics, pp. 55–61, ASME 1992.

Russo, " Controlling Dissipative Magnetic Particle Brakes in Force Reflective Devices," DSC–vol. 42, Advances in Robotics, pp. 63–70, ASME 1992.

Kontarinis et al., "Display of High–Frequency Tactile Information to Teleoperators," Telemanipulator Technology and Space Telerobotics, Won S. Kim, Editor, Proc. SPIE vol. 2057, pp. 40–50, Sep. 7–9, 1993.

Patrick et al., "Design and Testing of a Non–reactive, Fingertip, Tactile Display for Interaction with Remote Environments," Cooperative Intelligent Robotics in Space, Rui J. de Figueiredo et al, Editor, Proc. SPIE vol. 1387, pp. 215–222, 1990.

Adelstein, "A Virtual Environment System For The Study of Human Arm Tremor," Ph.D. Dissertation, Dept. of Mechanical Engineering, MIT, Jun. 1989.

Bejczy, "Sensors, Controls, and Man–Machine Interface for Advanced Teleoperation," Science, vol. 208, No. 4450, pp. 1327–1335, 1980.

Bejczy, "Generalization of Bilateral Force–Reflecting Control of Manipulators," Proceedings Of Fourth CISM–IFToMM, Sep. 8–12, 1981.

McAffee, "Teleoperator Subsystem/Telerobot Demonsdtrator: Force Reflecting Hand Controller Equipment Manual," JPL D–5172, pp. 1–50, A1–A36, B1–B5, C1–C36, Jan. 1988.

Minsky, "Computational Haptics: The Sandpaper System for Synthesizing Texture for a Force–Feedback Display," Ph.D. Dissertation, MIT, Jun. 1995.

Jacobsen et al., "High Performance, Dextrous Telerobotic Manipulator With Force Reflection," Intervention/ROV '91 Conference & Exposition, Hollywood, Florida, May 21–23, 1991.

Shimoga, "Finger Force and Touch Feedback Issues in Dexterous Telemanipulation," Proceedings of Fourth Annual Conference on Intelligent Robotic Systems for Space Expploration, Rensselaer Polytechnic Institute, Sep. 30—Oct. 1, 1992.

IBM Technical Disclosure Bullein, "Mouse Ball–Actuating Device With Force and Tactile Feedback," vol. 32, No. 9B, Feb. 1990.

Terry et al., "Tactile Feedback in A Computer Mouse," Proceedings of Fouteenth Annual Northeast Bioengineering Conference, University of New Hampshire, Mar. 10–11, 1988.

Howe, "A Force–Reflecting Teleoperated Hand System for the Study of Tactile Sensing in Precision Manipulation," Proceedings of the 1992 IEEE International Conference on Robotics and Automation, Nice, France, May 1992.

Eberhardt et al., "OMAR—A Haptic display for speech perception by deaf and deaf–blind individuals," IEEE Virtual Reality Annual International Symposium, Seattle, WA, Sep. 18–22, 1993.

Rabinowitz et al., "Multidimensional tactile displays: Identification of vibratory intensity, frequency, and contactor area," Journal of The Acoustical Society of America, vol. 82, No. 4, Oct. 1987.

Bejczy et al., "Kinesthetic Coupling Between Operator and Remote Manipulator," International Computer Technology Conference, The American Society of Mechanical Engineers, San Francisco, CA, Aug. 12–15, 1980.

Bejczy et al., "A Laboratory Breadboard System For Dual–Arm Teleoperation," SOAR '89 Workshop, JSC, Houston, TX, Jul. 25–27, 1989.

Ouh–Young, "A Low–Cost Force Feedback Joystick and Its Use in PC Video Games," IEEE Transactions on Consumer Electronics, vol. 41, No. 3, Aug. 1995.

Marcus, "Touch Feedback in Surgery," Proceedings of Virtual Reality and Medicine The Cutting Edge, Sep. 8–11, 1994.

Bejczy, et al., "Universal Computer Control System (UCCS) For Space Telerobots," CH2413–3/87/0000/0318501.00 1987 IEEE, 1987.

Aukstakalnis et al., "Silicon Mirage: The Art and Science of Virtual Reality," ISBN 0–938151–82–7, pp. 129–180, 1992.

Eberhardt et al., "Including Dynamic Haptic Perception by The Hand: System Description and Some Results," DSC–vol. 55–1, Dynamic System and Control: vol. 1, ASME 1994.

Gobel, et al., "Tactile Feedback Applied to Computer Mice," International Journal of Human–Computer Interaction, vol. 7, No. 1, pp. 1–24, 1995.

Pimentel et al., "Virtual Reality: through the new looking glass," $2^{nd}$ Edition; McGraw–Hill, ISBN 0–07–050167–X, pp. 41–202, 1994.

"Cyberman Technical Specification," Logitech Cyberman SWIFT Supplement, Apr. 5, 1994.

Ouhyoung et al., "The Development of A Low–Cost Force Feedback Joystick and Its Use in the Virtual Reality Environment," Proceedings of the Third Pacific Conference on Computer Graphics and Applications, Pacific Graphics '95, Seoul, Korea, Aug. 21–24, 1995.

Kaczmarek et al., "Tactile Displays," Virtual Environment Technologies.

"Taking a Joystick Ride", Computer Currents, Tim Scanneli, Nov. 1994, Boston Edition, vol. 9, No. 11.

"Coaxial Control Shaker Part No. C–25502," Safe Flight Instrument Corporation, 26 pages, Jul. 1, 1967; Revised Jan. 28, 2002.

Kontarinis, D. et al., "Display of high–frequency tactile information to teleoperators," Telemanipulator Technology and Space Telerobotics, SPIE Proceedings, 1993, vol. 2057, pp. 40–50.

Kaczmarek, K. et al., "Tactile Displays," Virtual Environments and Advanced Interface Design, edited Barfield et al., 1995, pp. 349–414.

Patrick, N. et al., "Design and Testing of a Non–reactive, fingertip, tactile display for interaction with remote environments," Cooperative Intelligent Robotics in Space, SPIE Proceedings, vol. 1387, 1990, pp. 215–222.

Rosenberg, "A Force Feedback Programming Primer For PC Gaming Peripherals Supporting I–Force 2.0 and Direct–X 5.0," Apr. 1997, Immersion Corporation.

Winey III, "Computer–Simulated Visual and Tactile Feedback as an Aid to Manipulator and Vehicle Control," Dept. of Mech. Eng., MIT, Jun. 1981.

Russo, "The Design and Implementation of a Three Degree–of–Freedom Force Output Joystick," Dept. of Mech. Eng., May 1990.

Iwata, "Artificial Reality with Force–feedback: Development of Desktop Virtual Space with Compact Master Manipulator," Computer Graphics, vol. 24, No. 4, Aug. 1990, pp. 165–170.

Ouh–young, et al., "Creating an Illusion of Feel: Control Issues in Force Display," Dept. of Comp. Science, Univ. of No. Carolina, Sep. 1989, pp. 1–14.

Gotow, et al., "Perception of Mechanical Properties at the Man–Machine Interface," Dept. of Mech. Eng., The Robotics Inst., Carnegie Mellon Univ., CH2503–1/87/0000, pp. 688–689.

Rosenberg, "Virtual fixtures as tools to enhance operator performance in telepresence environments," SPIE Telemanipulator Technology, 1993.

Rosenberg, "Virtual haptic overlays enhance performance in telepresence tasks," Dept. of Mech. Eng., Stanford Univ., 1994.

Rosenberg, "Perceptual Design of a Virtual Rigid Surface Contact," Center for Design Research, Stanford Univ., Armstrong Laboratory, Apr. 1993, pp. i–vi, 1–40.

Rosenberg, et al., "Perceptual Decomposition of Virtual Haptic Surfaces," Proc. IEEE Symposium On Research Frontiers in Virtual Reality, Oct. 1993.

Howe, et al., "Task Performance with a Dextrous Teleoperated Hand System," Harvard Univ., Proc. of SPIE, vol. 1833, Nov. 1992, pp. 1–9.

Batter, et al., "GROPE–1: A Computer Display to the Sense of Feel," Proc. IFIP Congress 1971, pp. 759–763.

Brooks, Jr., et al., "Project GROPE—Haptic Displays for Scientific Visualization," Dept. of Computer Science, Univ. of No. Carolina, pp. 177–185.

Atkinson, et al., "Computing With Feeling," Comput. & Graphics, vol. 2, pp. 97–103, 1977.

Wiker, et al., "Development of Tactile Mice for Blind Access to Computers: Importance of Stimulation Locus, Object Size, and Vibrotactile Display Resolution," Proc. of the HFS $35^{th}$ Annual Mtg., 1991, pp. 709–712.

Kelley et al., "Magic Mouse: Tactile & Kinesthetic Feedback in the Human–Computer Interface using an Electromagnetically Acutuated Input/Output Device," University of British Columbia, 1993, pp. 1–27.

Kelley et al., "On the Development of a Force–Feedback Mouse & its Integration into a Graphical User Interface," Int'l Mechanical Eng. Congress Exhibition, 1994, p. 1–8.

Payette et al., "Evaluation of a Force Feedback (Haptic) Computer Pointing Device in Zero Gravity," ASME Dynamics Systems, DSC–vol. 58, 1996, p. 547–553.

Rosenberg et al., "Commercially Viable Force Feedback Contgroller for Individuals w/Neuromotor Disabilities," Armstrong Lab., AL/CF–TR–1997–0016, 1996, p. 1–33.

Adachi et al., "Sensory Evaluation of Virtual Haptic Push–Buttons," Suzuki Motor Corp., 1994, p. 1–7.

Ramstein, C., "Combining Haptic & Braille Technologies: Design Issues & Pilot Study," ACM Conf., ASSETS '96, 1996, p. 37–44.

Ellis et al., "Design & Evaluation of a High–Performance Prototype Planar Haptic Interface," DSC–vol. 49, ASME, 1993, p. 55–64.

Hirota et al., "Development of Surface Display," IEEE 0–7803–1363–1, 1993, p. 256–262.

Ramstein et al., "The Pantograph: A Large Workspace Haptic Device for a Multimodal Human–Computer Interaction," Computer–Human Interaction, CHI, 1994, p. 1–3.

Munch et al., "Intelligent Control for Haptic Displays," Eurographics, vol. 15 #3, Eurographics 1996, p. 1–10.

Akamatsu et al., "Multimodal Mouse: A Mouse–Type Device with Tactile and Force Display," Presence, vol. 3, No. 1, 1994, p. 73–80.

Su et al., "The Virtual Planel Architecture: A 3D Gesture Framework," IEEE 4–7803–1363–1, 1993, p. 387–393.

Rosenberg et al., "The Use of Force Feedback to enhance Graphical User Intefaces," 1996, Proc. SPIE 2653, 19, p. 243–248.

Minsky et al., "Feeling & Seeing: Issues in Force Display," ACM 089791–351–5, 1990, p. 235–242, 270.

Schmult et al., "Application Areas for a Force Feed–back Joystick," ASME, DSC–vol. 49, 1993, p. 47–54.

Hannaford et al., "Force–Feedback Cursor Control," NASA Tech Brief, vol. 13, No. 11, 1989, p. 1–4.

Hasser, et al., "Tactile Feedback with Adaptive Controller for a Force–Reflecting Haptic Display," Parts 1 and 2, 0–7803–3131 IEEE Jan. 1996, pp. 526–533.

Hasser, "Tactile Feedback for a Force–Reflecting Haptic Display," School of Engineering, University of Dayton, Dec. 1995, pp. i–xii, 1–99.

Rosenberg et al., "Conmmercially Viable Force Feeback Contgroller for Individuals w/Neuromotor Disabilities," Armstrong Lab., AL/CF–TR–1997–0016, 1996, PP. 1–33.

Adachi et al., "Sensory Evaluation of Virtual Haptic Push–Buttons," Suzuki Motor Corp., 1994, pp. 1–7.

Ramstein, C., "Combining Haptic & Braille Technologies: Design Issues & Pilot Study," ACM Conf., ASSETS '96, 1996, pp. 37–44.

* cited by examiner

MOUSE DEVICE WITH TACTILE FEEDBACK APPLIED TO HOUSING

TECHNICAL FIELD

The present invention relates to a tracking device and a method for a sensory feedback from a cursor status for a cursor with graphical details being scanned or passed in connection with a program or comprising it. More specifically the invention provides a signal to be generated for a sensory feedback generating a movement of the tracking device.

BACKGROUND OF THE INVENTION

The user interface in form of a window (Window) as a facility to access special program functions in a data program is found in almost every modern interface. The program basing on the use of windows comprises also function keys in e.g. key rows, screen and display delimiters and icons, so-called graphic symbols.

To achieve access to the functions contained in the symbols a cursor is controlled by means of a tracking device (computer mouse, trackball, pointer, etc.) over a display unit showing the symbols, the function of the symbol being produced by e.g. pressing a key with one or several touches.

A problem with the control of the cursor to effect the symbols arises when it is difficult to fix the cursor to the symbol in a distinct way to let the touches have the desired effect.

It is easier to hit e.g. keys situated at the edge of a display than one in its centre. To hit a key at the edge the computer mouse is pulled quickly in the right direction to reach the key. It has no importance if the computer mouse is pulled too far. The cursor will anyhow stop at the edge. To hit a key situated e.g. in the centre of the displays frame more coordination is however required by a user of the computer mouse to hit the target, thus, the user must e.g. slow down the tracking device before the key is reached to let the cursor land on the key. This step takes time and might be difficult and might even give the user stress and irritation.

A further problem, which is related to the use of tracking devices for said object, is that the user requires a simultaneous feature, i.e. to e.g. quickly localize the key for the memorizing function in a program without necessarily having to let the eye scan the display unit.

In the european patent application EP-A1-0,607,580 a computer mouse with a pin is described receiving signals from a host computer unit effecting the pin which generates sensory signals to a users finger top e.g. when the cursor status is altered The invention according to said EP-application is, however, not without problems in that a finger top must be kept in contact with the pin. Ergonometric studies have shown that the user of a computer mouse when continuously using the computer mouse hardly can keep the finger tops over the same spot over a longer period of time. This is easily understood by ordinary people as some users are easily seized with cramp, writing cramps being a well known complaint. Furthermore, some people suffer from a lighter or heavier trembling. Thus the computer mouse with a pin is restricted in its use for a not negligible part of the users of tracking devices.

SUMMARY OF THE INVENTION

The present invention intends to solve above mentioned problems related to a window face and similar in a new and innovative manner.

To achieve said object of the invention it is for marking graphical details in connection with or comprised in the program proposed a tracking device as a user interface for the access of program functions comprised in the details.

A cursor as a tracking device controlling on a display receives a sensory feedback from status signals for a user of the cursor in a host unit, when the cursor hits or passes said graphical details, in such a way that means arranged in the tracking device generate a movement of the tracking device.

The movement of the tracking device consists of that it vibrates, bounces, bumps or slants.

The cursor might be fixed within the limits of optional derails, even three-dimensional ones, when the cursor hits the limit or passes it and the cursor is thus released by pushing the tracking device mantle downwards.

A graphical detail might be an icon, a key, a window or a border limiting the window.

Alternatively, graphical details in form of key rows provide various sensory feedback depending on the key and its function.

In a further alternative the cursor being fixed within a detail, is free to move within the borders of the detail.

The cursor, being fixed within a three-dimensional object or detail, is possibly free to move within the volume of the object or the detail in an embodiment with the cursor possibly generating a shadow within the object or the detail when drawn out of these without first having been released. The shadow allows that the cursor can be moved more easily into the object or the detail. The invention comprises even a method for marking graphical details by means of a tracking device.

BRIEF DESCRIPTION OF THE DRAWING

The invention will be described here below more in detail with reference so the attached figures of the drawings, where FIG. 1 schematically illustrates a tracking device in form of a computer mouse connected to a host computer unit with a display showing graphical details and a sensory feedback to the computer mouse according to the invention, FIG. 2 schematically illustrates an alternative sensory feedback in a tracking device according to FIG. 1, FIG. 3 schematically illustrates a pressing of the tracking device according to FIG. 1 in an embodiment of the invention, FIG. 4 schematically illustrates in an exploded view of the computer mouse an embodiment of how a means might be arranged in the computer mouse to achieve a movement of the computer mouse, FIG. 5 schematically illustrates how a cursor with a shadow is shown, when the user of the cursor touches a tracking device in a three-dimensional environment according to an embodiment of the invention.

DETAILED DESCRIPTION OF PREFERRED EMBODIMENTS

The present invention is here described more in detail with alternative embodiments illustrating the technology of the invention and the cognitive, tactile and motoric advantages provided by a tracking device according to the invention.

Figure 1:
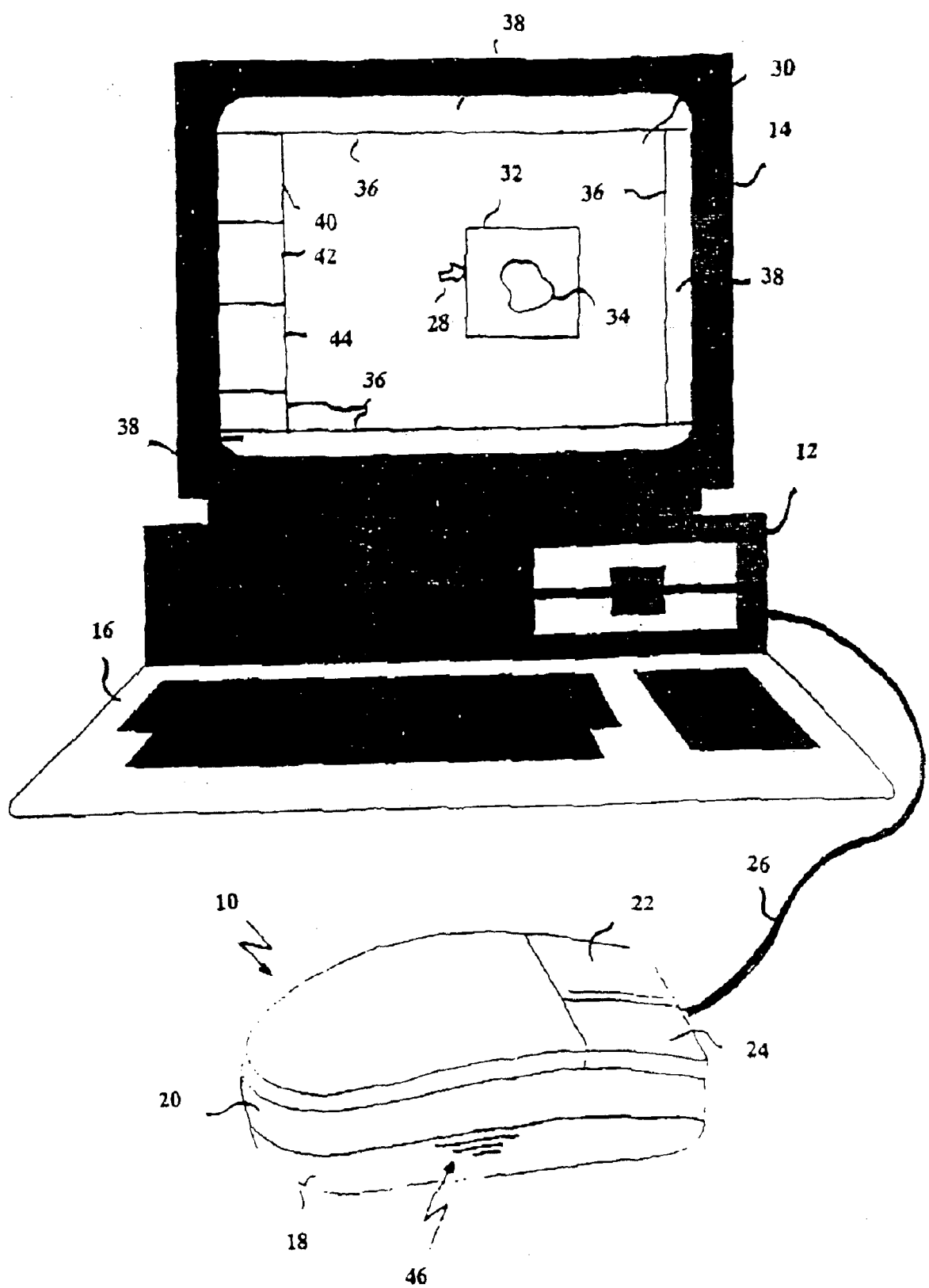

FIG. 1 illustrates schematically a computer mouse 10 connected to a host unit 12 in form of a computer, here a PC, with a display unit 14 and a key board 16.

The present invention with its embodiments specifically describes a computer mouse 10, the invention is however generally applicable to a majority of already known tracking devices such as track balls for portable computers, pointers, etc.

The computer mouse 10 consists of a casing 20 movable in relation to a bottom portion 18 and the conventional function keys 22, 24. Furthermore, the computer mouse is connected to a host unit 12, 14, 16 by means of a signal cable 26 comprising signal lines for a track balls, here not shown, transmitters in the x and y-direction. Furthermore, the signal cable comprises lines for transmitting status signals for the cursor 28 from a cursor controller comprised in the host unit 12, 14.

The display 14 shows schematically in its frame 30 how the interface might be in a window environment. The frame 30 besides the display cursor 28 a window 32, an icon 34, a display border 36, a line of three keys 40, 42, 44 and three areas with special attributes not to be described in detail.

When the cursor 28 by means of the computer mouse 10 is moved towards or over the periphery 32, 34, 36, 40, 42, 44 of a graphical detail the host unit 12, 14 in one embodiment of the invention generates by means of the cursor controllers status (x- and y-coordinates, status flags, etc.) for the cursor 28 a sensory feedback in form of a signal by means of signal lines in the cable 26. The signal provides that a means arranged in the computer mouse 10 generates a movement of the computer mouse 10, e.g. in a form that the computer mouse vibrates, bounces, bumps, slants, etc.

In an alternative embodiment even the cursor 28 is fixed within the borders, but preferably in such a way, that it is free to move between the borders, e.g. between the borders 32 and 34 for the window and the icon, respectively, if it is fixed within the window.

In fixing the cursor 28 within a graphical detail the status register for the cursor 28 is initiated that a signal is sent to the computer mouse 10 with its casing 20 receiving a sensory feedback in that the cursor 28 has been fixed within or to a graphical detail 32, 34, 36, 40, 42, 44. In the present embodiment the casing 20 vibrates 46 in relation to the bottom portion 18. The complete computer mouse might eventually vibrate in an embodiment without any specific casing and specific bottom portion. A tracking device 10 might instead of vibrating bounce or bump each time the cursor is moved towards or fixed onto a graphical detail.

The vibrations can be achieved by means of devices such as electromagnets, piezoelectric transmitters, composite metals and other devices available in the market possibly achieving vibrations.

Furthermore, the graphical detail, in which the cursor 28 has been fixed, might in another embodiment be identified by means of the vibration frequency. In mots cases it is quite sufficient that a few graphical details are to be identified by means of the vibration frequency, e.g. by means of an enter key, here designates 40, so that a simultneous effect is achieved in that e.g. a program or a data file has to be entered. This is achieved without the user necessarily sweeping or drifting with his eyes over the frame 30 to find the enter key 40. In principle most graphical derails might, however, be provided with a specific code by means of the vibration frequency.

The cursor 28 being fixed within a frame it must be possibly released from this fixation. According to an embodiment of the present invention this is achieved in that the computer mouse 10 or any other used tracking device is extended to a pressure downwards effecting a signal transmitter, e.g. a pressure transmitter, co change the status of the cursor 28, the user then feeling as if it presses out the cursor or is diving under the edge of the border, thus improving the perception of the process on the frame 30.

In feeling that the cursor is sliding over e.g. a key 40 the picture of the key 40 is elucidated. In a similar way the picture of a window 32 is intensified.

A parallel to the present invention is the introduction of shadows in a graphical interfaces. In that the user can see the shadow of an interface, such as a window, it becomes much easier to understand the concept with several layers in windows, i.e. windows overlapping each order. This provides a three-dimensional effect and improves the aesthetic aspect and provides even an improvement of the users perception of the interface rending it mor effective. The present invention achieves similar features which provides the parallelism.

Figure 2:
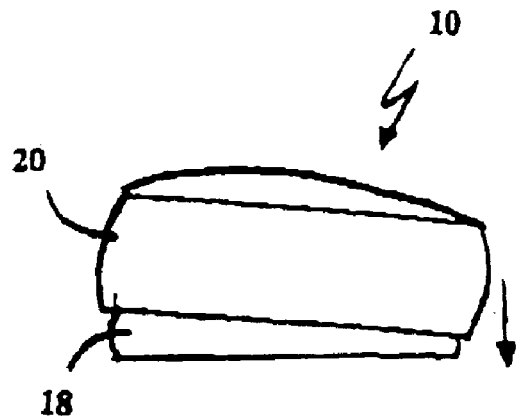

In FIG. 2 is shown another embodiment of a sensory feedback according to the invention.

FIG. 2 schematically illustrates the computer mouse 10, the casing 20 being movable in relation to the bottom portion 18, slants to the right in the figure, marked by a downwards pointing arrow as a sensory feedback from the status register of the cursor 28. The slanting might even be achieved forwards, backwards, to the left, etc. Thus, the corresponding slanting indicates a code. The slanting to the right might e.g. imply the key for the entering function 40. In the same way, the other silanting positions might indicate the code for another graphical detail 32, 34, 36, 40, 42, 44. Furthermore, alternating slanting positions for a feedback might indicate further codes.

Meanss for slanting the computer mouse 10 might consist of electromagnets, relays, etc.

Figure 3:
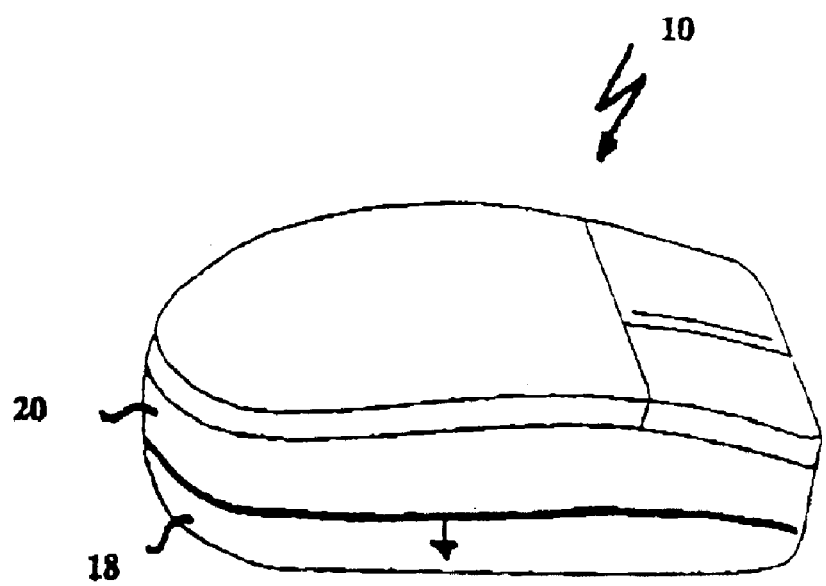

To leave a fixation within the limited area of a graphical detail or its periphery it is illustrated in FIG. 3, how the casing of the computer mouse 10 is pressed against the bottom portion 18, a pressure transmitter e.g. generating a signal to the cursor 28 to leave a limited area, where it previously had been fixed. As already mentioned the computer mouse 10, with the casing 20 and the bottom portion 18 forming together a unit, even by means of a convenient arrangement is provided with a pressure transmitter to achieve signals releasing the cursor 28.

Figure 4:
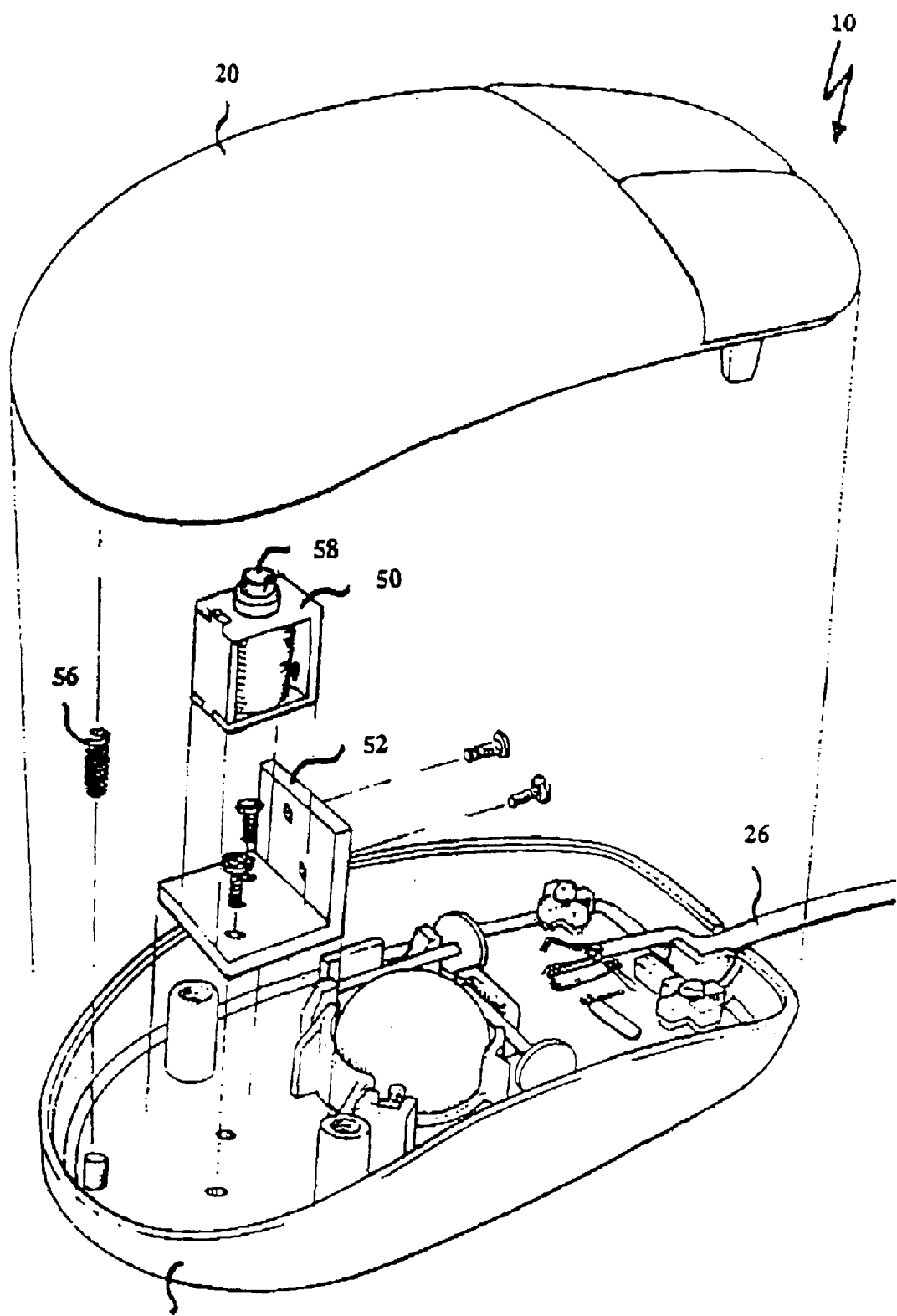

Regarding the arrangement of meanss adapted to generate the sensory feedback in a tracking device it is preferably design precautions for the man of the art, but with reference to FIG. 4 an embodiment is exemplified how the means might be arranged within a computer mouse 10.

FIG. 4 illustrates, how an electromagnet 50 by means of screws is arranged in a means of attachment 52, here fixed by means of screws in the bottom portion 18 of the computer mouse 10. Between the casing 20 and the bottom portion 18 a resilient means 56 is placed. When the computer mouse 10 receives the sensory feedback signal the anchor 58 of the electromagnet 50 hits the casing 20 generating a movement in the casing 20. The movement transforms into a vibration by means of the potential energy stored in the resilient means 56. To achieve a coding of the sensory feedback as described above already known meanss generating pulse sequences might be used.

Moreover, the present invention solves the problems connected to the sensory feedback by means of a pin as described in EP-A1-0-607,580 in that the mouse itself vibrates making it easier for the user with a tendency to be seized with cramp and trembling to use the computer mouse 10. They do not necessarily have to touch the computer mouse with any specific position of the hand as the whole computer mouse according to the invention is moving.

Figure 5:
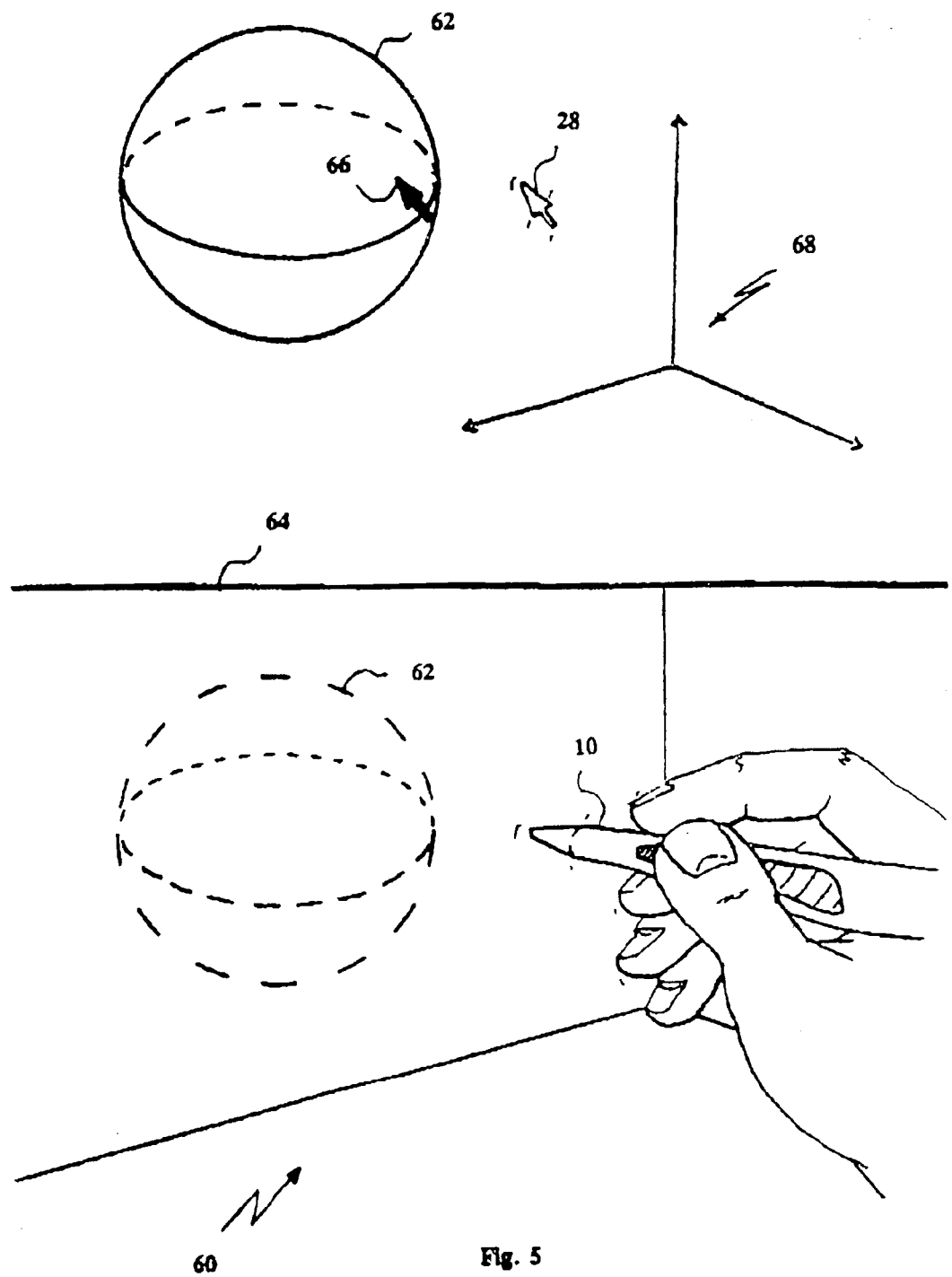

FIG. 5 illustrates how a cursor with a shadow is shown, when according to one embodiment of the present invention a user of the cursor touches a tracking device in a three-dimensional virtual surrounding 60, e.g. a space.

The tracking device 10 is moved to a desired virtual object 62 in form of a three-dimensional volume without the object being visible in space. However, the cursor 28 controlled by the pointer might be followed on a display means delimited by means of the solid line 64. The display means is not necessarily a computer screen 30 but relay consist of any other form of picture reproduction means, e.g. a mirror.

The object 62 is visible to a user on the display means delimited by the line 64 in FIG. 5 i.e. nor virtually as the surroundings 60.

Moreover, the cursor 28 has a shadow 66 on the display means 64 remaining within the object, when the cursor is pulled out of the object, if the tracking device is not released by means of e.g. a pressing downwards. A user of the racking device finds in some way easier back to the object 62 in the virtual surroundings after e.g. a pause or another exit from the space of the object 62. The cursor is then integrated with the shadow when it is situated in the object 62.

The facts mentioned above are e.g. applicable in CAD programs such as ALIAS i.a. being used in the car industry to design products, where it is a problem to decide, where in the space depth the cursor 28 is simated. It should also be observed that the virtual space 60 may comprise numbers of space objects 62 in various geometric forms, the usefulness of the shadow 66 becoming obvious.

The depth of a space object 62 is e.g. defined by means of a coordinate system 68 in three dimensions, such as a cartesian or a polar system, etc.

Another possible application area for the embodiment above of the cursor 28 with a shadow 66 is in surgery field, e.g. for training of surgical candidates or for more advanced surgery of more or less complicated operations.

A three-dimensional picture or a picture in perspective consists conventionally of a program providing mesh models of objects 62 without any space therein. The space might be calculated in real time when a surface is passed in the object 62. Thus, a surface in the object 62 is defined by means of here not shown polygon rendered in real time, the necessary surface to obtain space thus being obtained.

The present invention has been described with preferred embodiments not to be considered to limit the invention. It is the definition of the claims that defines the invention for the man of art.

What is claimed is:

1. An apparatus, comprising:
   a housing having a base, a casing and a button, said casing and said button being movable with respect to said base;
   a tracking element disposed within said housing, said tracking element configured to track a motion of said housing in a first direction and a second direction different from the first direction;
   a movement generator disposed within and coupled to said housing, said movement generator configured to deliver a tactile sensation to the casing in response to a sensory feedback signal received over a signal channel; and
   a resilient material disposed between said casing and said base, said resilient material configured to store and release energy.

2. The apparatus of claim 1, wherein said movement generator is configured to generate vibrations of varying frequency corresponding to different graphical details on a graphical display.

3. The apparatus of claim 2, wherein said sensory feedback signal is configured to convey a particular vibration frequency by a coding of pulse sequences.

4. The apparatus of claim 1, wherein said movement generate is configured to generate said tactile sensation over the entirety of said housing.

5. The apparatus of claim 1, wherein said movement generator is configured to move said casing portion with respect to said base.

6. The apparatus of claim 1, wherein said movement generator includes an electromagnetic actuator.

7. The apparatus of claim 1, wherein said movement generator is further configured to deliver the tactile sensation based on an interaction with graphical details on a graphical display, at least one of the graphical details being a border of a window.

8. The apparatus of claim 1, wherein said movement generator is further configured to deliver the tactile sensation based on an interaction with graphical details on a graphical display, at least one of the graphical details being an icon.

9. The apparatus of claim 1, wherein the motion of said housing includes a vibration of said housing, different graphical details of a graphical display corresponding to different frequencies of the vibration.

10. The apparatus of claim 1, wherein said movement generator is configured to generate a motion of said housing by impacting said housing with a moving portion of said movement generator.

11. The apparatus of claim 10, wherein said movement generator is configured to impact said housing at a location underneath a top surface of said housing.

12. The apparatus of claim 5, wherein said movement of said casing portion includes slanting the casing portion in a direction with respect to said lower portion.

13. An apparatus, comprising:
   a housing including a lower portion and an upper portion, said lower portion movable over a substantially flat surface, said upper portion being movable with respect to said lower portion;
   a tracking element disposed within said housing, said tracking element configured to track movement of said housing with respect to the substantially flat surface;
   a movement generator disposed within and couple to said housing, said movement generator configured to output a tactile sensation through said upper portion of said housing in response to a sensory feedback signal received over a signal channel; and
   a resilient material disposed between said lower portion and said upper portion, said resilient material configured to store and release energy.

14. The apparatus of claim 13, wherein said movement generator is configured to output bump sensations of varying magnitude corresponding to graphical details on a graphical display.

15. The apparatus of claim 13, wherein said movement generator is configured to vibrate said housing at varying frequencies corresponding to different graphical details on a graphical display.

16. The apparatus of claim 13, wherein the tactile sensation includes a vibration of said housing, the sensory feedback signal being configured to convey a particular vibration frequency based on a coding of pulse sequences.

17. The apparatus of claim 14, wherein said resilient material is configured to enable said bump sensation.

18. The apparatus of claim 13, wherein said movement generator is configured to move said upper portion of said housing with respect to said lower portion of said housing.

19. The apparatus of claim 13, wherein said movement generator includes an electromagnetic actuator.

20. The apparatus of claim 13, wherein said movement generator is configured to activate based on a simulated interaction with graphical details on a graphical display, at least one of the graphical details being a border of a window.

21. The apparatus of claim 13, wherein said movement generator is configured to activate based on a simulated interaction of a cursor with graphical details on a graphical display, at least one of the graphical details being an icon.

22. The apparatus of claim 13, wherein said tactile sensation includes a vibration of said housing.

23. The apparatus of claim 13, wherein said movement generator is configured to generate motion of said upper portion of said housing by impacting said upper portion with a moving portion of said movement generator.

24. A method, comprising:
  receiving at a mouse device a sensory feedback signal, the mouse device having a button, a casing portion and a bottom portion, the button and the casing portion being movable with respect to the bottom portion, a resilient material being disposed between the casing portion and the bottom portion; and
  generating a movement of the casing portion of said mouse device with respect to the bottom portion of said mouse device in response to said received sensory feedback signal.

25. The method of claim 24, wherein generating the movement includes generating vibrations of varying frequency, each frequency corresponding to a different graphical detail on a graphical display.

26. The method of claim 25, wherein the sensory feedback signal is operative to output a particular vibration frequency by a coding of pulse sequences.

27. The method of claim 24, wherein the movement of the casing portion is generated by a movement generator including electromagnets.

28. The method of claim 27, wherein the movement generator is configured to activate based on a simulated interaction with graphical details on a graphical display, at least one of the graphical details being a border of a window.

29. The method of claim 27, wherein the movement generator is configured to activate based on a simulated interaction with graphical details on a graphical display, at least one of the graphical details being an icon.

30. The method of claim 24, wherein the movement of the casing portion includes a vibration of the casing portion.

31. The method of claim 24, wherein a movement generator is configured to generate the movement of the casing portion by impacting the casing portion with a moving portion of the movement generator.

32. The method of claim 31, wherein the movement generator impacts the casing portion at an upper surface of the casing portion.

33. The method of claim 24, wherein the movement of the casing portion includes slanting the casing portion in a direction with respect to the bottom portion.

34. The method of claim 24, further comprising:
  limiting a movement of a cursor to within a border of a graphical detail on a graphical display; and
  releasing said cursor from within the border when the casing portion is depressed with respect to said bottom portion.

* * * * *